(12) United States Patent
Le Blanc

(10) Patent No.: US 11,534,024 B2
(45) Date of Patent: Dec. 27, 2022

(54) TRIVET SAFELY DEVICE

(71) Applicant: Eric Le Blanc, Murrieta, CA (US)

(72) Inventor: Eric Le Blanc, Murrieta, CA (US)

(73) Assignee: Eric Le Blanc, Murrieta, CA (US)

(*) Notice: Subject to any disclaimer, the term of this patent is extended or adjusted under 35 U.S.C. 154(b) by 0 days.

(21) Appl. No.: 16/847,366

(22) Filed: Apr. 13, 2020

(65) Prior Publication Data

US 2021/0315417 A1  Oct. 14, 2021

(51) Int. Cl.
  *A47J 36/34* (2006.01)
  *A47G 23/06* (2006.01)
(52) U.S. Cl.
  CPC .......... *A47J 36/34* (2013.01); *A47G 23/0683* (2013.01)
(58) Field of Classification Search
  CPC ..... A47J 36/34; A47G 23/0683; F24C 15/107
  USPC ...................................... 248/176.2; 220/630
  See application file for complete search history.

(56) References Cited

U.S. PATENT DOCUMENTS

| | | | | | |
|---|---|---|---|---|---|
| 1,781,056 | A | * | 11/1930 | Elder | A47J 36/34 |
| | | | | | 211/41.2 |
| 3,198,189 | A | * | 8/1965 | Oatley | F24C 15/36 |
| | | | | | 126/24 |
| 3,313,919 | A | * | 4/1967 | Richardson | H05B 3/68 |
| | | | | | 219/433 |
| 3,372,688 | A | * | 3/1968 | Moore | F24C 15/107 |
| | | | | | 126/24 |
| 5,474,206 | A | * | 12/1995 | Herring, Sr. | A47J 43/0727 |
| | | | | | 220/630 |
| 5,743,045 | A | * | 4/1998 | Hicks | A01G 9/04 |
| | | | | | 47/71 |
| 8,297,272 | B2 | * | 10/2012 | Williams | F24C 15/36 |
| | | | | | 126/42 |
| 8,561,957 | B2 | * | 10/2013 | Levine | A47J 36/34 |
| | | | | | 248/346.03 |
| 2018/0303267 | A1 | * | 10/2018 | Le Blanc | A47J 36/34 |
| 2021/0315417 | A1 | * | 10/2021 | Le Blanc | A47J 36/34 |

\* cited by examiner

*Primary Examiner* — Muhammad Ijaz
(74) *Attorney, Agent, or Firm* — Maschoff Brennan

(57) ABSTRACT

Embodiments of the invention relate to a trivet safety device. More particularly, the present invention relates to a trivet member and a channel insert connected to the trivet member, the channel insert includes two guide rail members separated by a fixed distance to form an insert slot for receiving the stem and block components of the safety cookware device, a stem channel and block locking components coupled to the two guide rail members, and back support rails coupled to stem channel and block locking components.

19 Claims, 17 Drawing Sheets

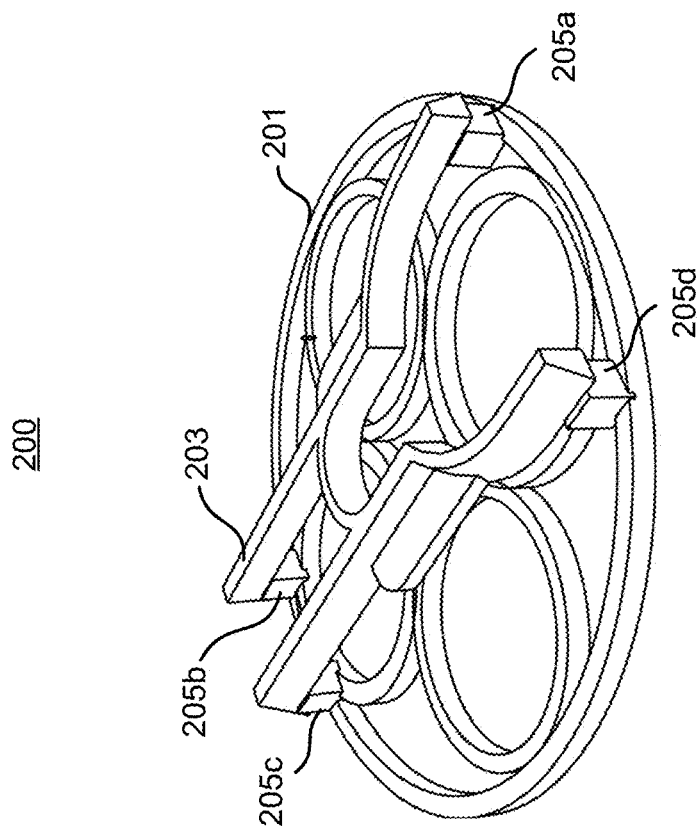
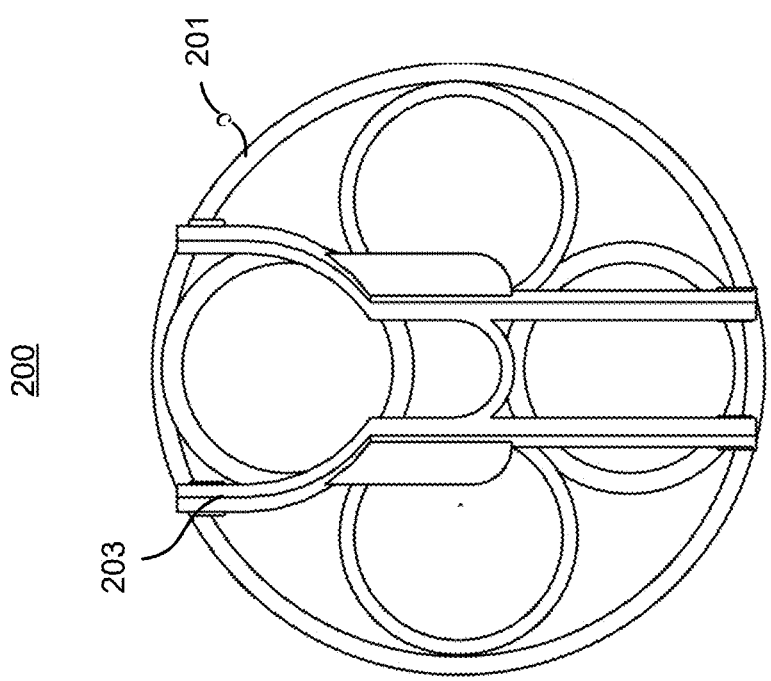
FIG.2B
FIG.2A

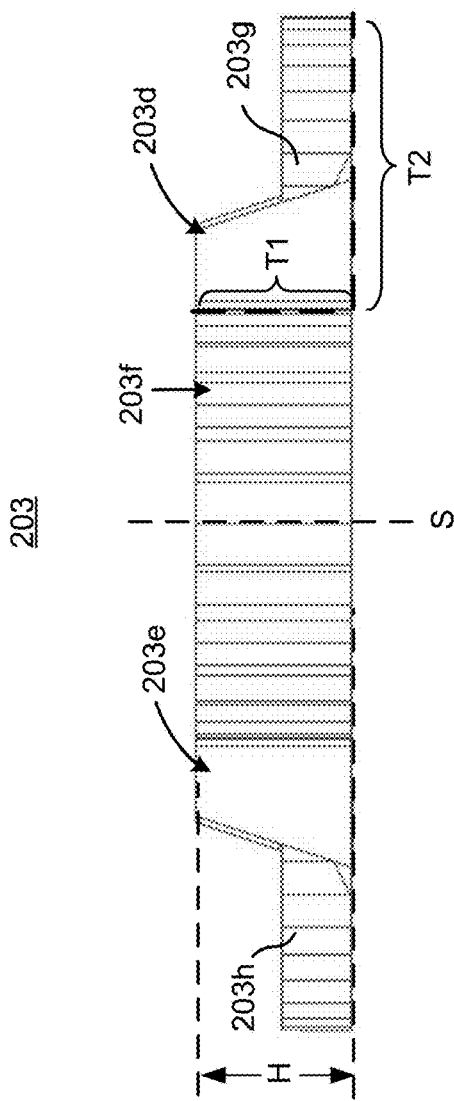
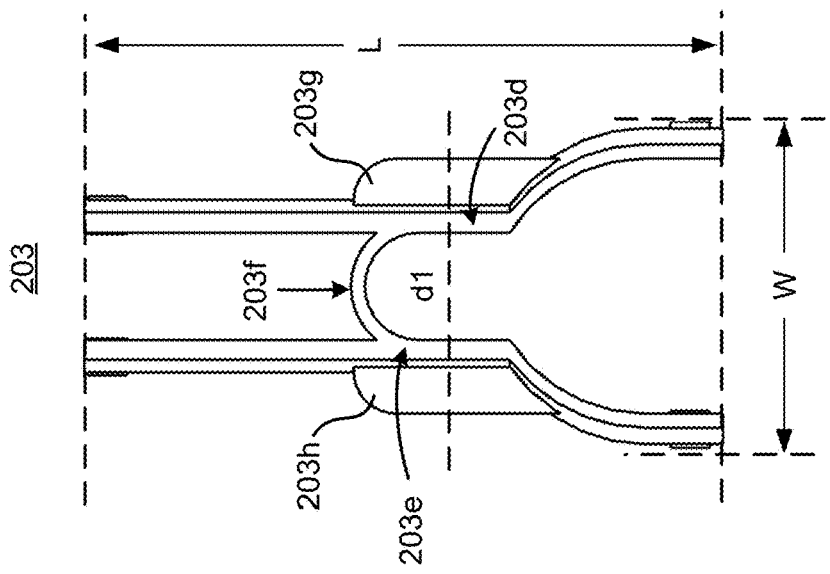
FIG. 4B
FIG. 4A

FIG.13A
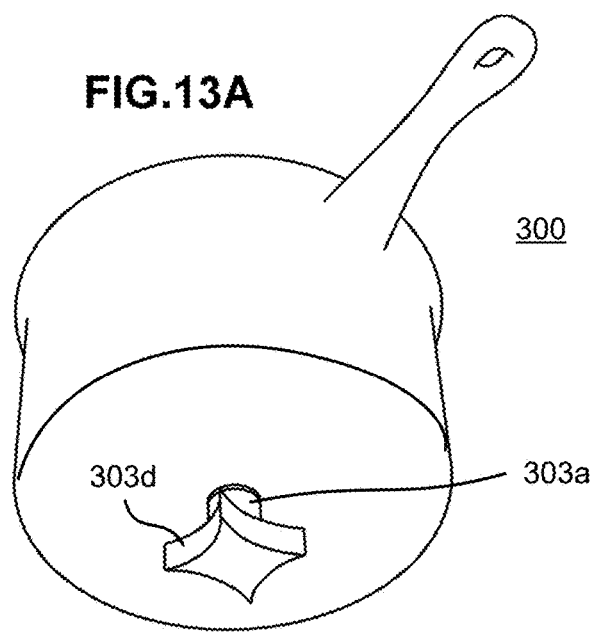
FIG.13B
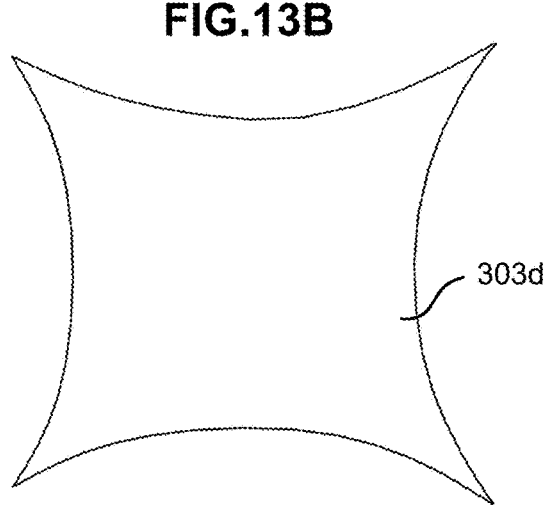
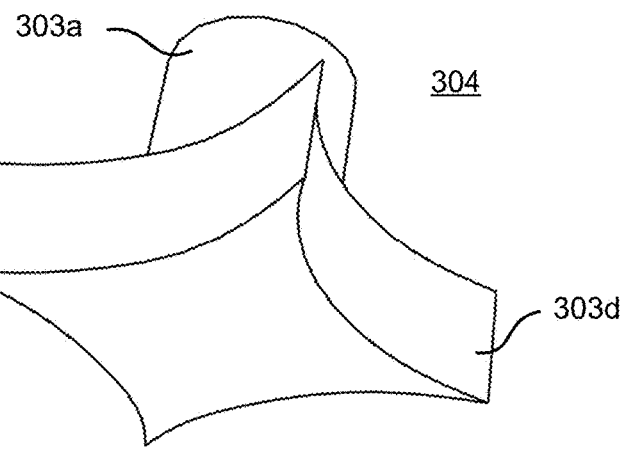
FIG.13C

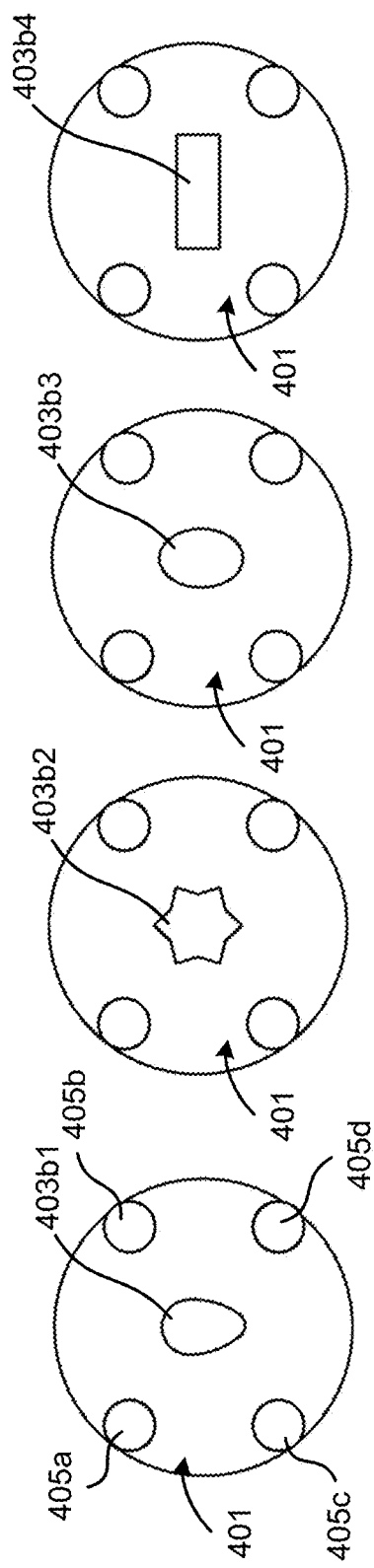

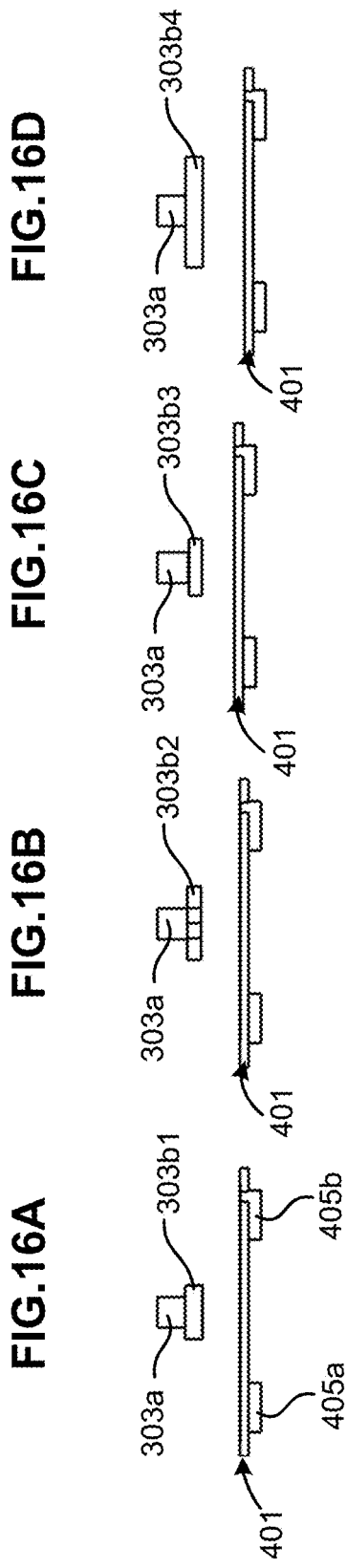

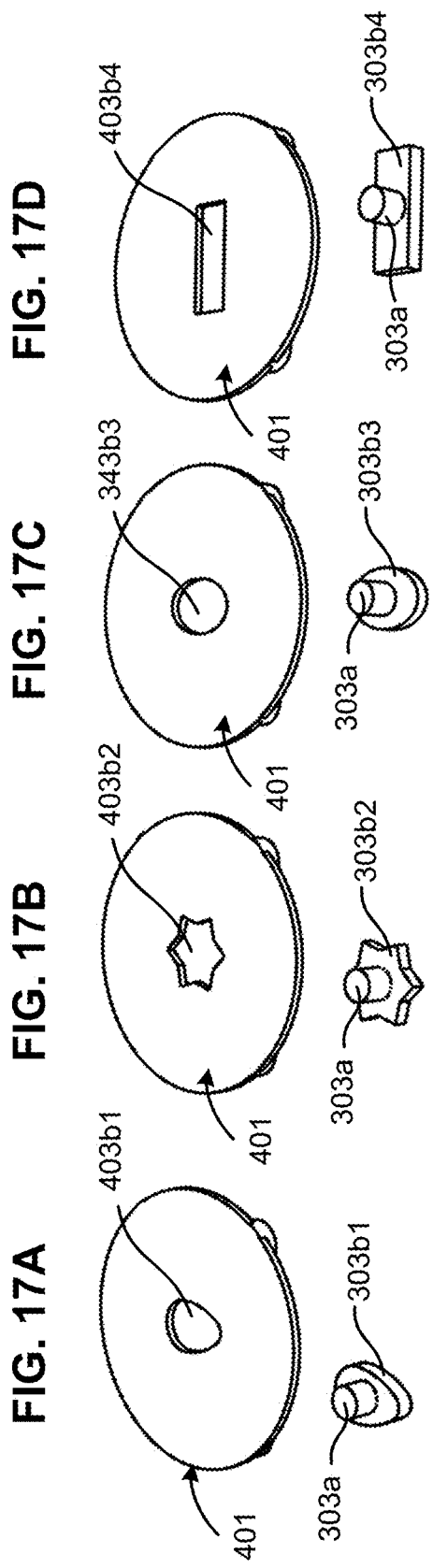

TRIVET SAFELY DEVICE

FIELD OF THE INVENTION

The present invention relates to a trivet safety device. More particularly, the present invention relates to a heat-absorbing platform having a channel insert or keyed insert slot for receiving and securing to a stem and block of a safety cookware device.

BACKGROUND

A trivet or hot pad is a heat-absorbing, planar and rigid platform placed between a heated cookware (i.e., pot or pan) and a table or countertop, shielding and protecting the surface of the table or countertop from heat damage.

Currently, there are many types of trivet designs having various shapes, sizes, and configurations. For example, one trivet design includes three or more leg structures to support the main holding platform of the trivet above and away from making contact to the countertop. Other types of trivet designs include special holders for housing a lit flame and for warming or heating food in the pot or pan.

In practice, the main holding platforms for all trivets are made planar so that the pot or pan typically lays flat to the surface. Because these surfaces are generally planar, there is no support mechanism that can prevent the pot or pan from sliding or moving off the trivet's platform, causing potential harm or inconvenience to users. In addition, because of its flat and planar surface, certain novel pot and pan designs, such as a safety cookware described in U.S. Pat. No. 10,561,265B2, entitled Child Cookware Safety Device and hereby incorporated by reference, may not be adapted to fit on the conventional trivet devices. Therefore, there is a need for an improved trivet which may allow users to prevent slippage while still allowing it to have other built-in safety mechanisms that support other types of pots and pan configurations.

SUMMARY

One object of this invention is to provide a safety trivet device for receiving and supporting a safety cookware device having a stem and block components, the safety trivet device including a trivet member, and a channel insert connected to the trivet member, the channel insert may include two guide rail members separated by a fixed distance to form an insert slot for receiving the stem and block components of the safety cookware device, a stem channel and block locking components connected to the two guide rail members, and back support rails connected to the stem channel and block locking components. The safety trivet device of claim 1, wherein the channel insert includes a plurality of posts disposed between the channel insert and the trivet.

In implementation, the stem channel and block locking components may include two stem guide rails and two planar block locks connected by a channel stop. In another implementation, the channel insert may include a plurality of posts disposed between the channel insert and the trivet. In yet another implementation, the stem channel and block locking components may include two stem guide rails and two planar block locks connected by a channel stop. In still yet another implementation, a cross-wise section of each stem guide rail member may be substantially perpendicular to a corresponding lengthwise section of each planar block lock, each stem guide rail member and planar block lock forming an L-shaped structure.

In addition, the safety trivet device may further include a pad member having a ring-like structure coupled to a bottom portion of the trivet, the pad member having non-scratching and non-slip properties, providing protection and grip between the safety trivet device and a table or countertop surface. Similarly, multiple pad members may be coupled to a bottom portion of the trivet, the multiple pad members each have non-scratching and non-slip properties, providing protection and grip between the safety trivet device and a table or countertop surface.

Moreover, the safety trivet device may also include a carrier tray having a base tray connected to a bottom portion of the safety trivet device, a left handle support member and a right handle support member connected at each end of the base tray via tray post members.

Other aspects of the safety trivet device may include a stem channel and block locking components having a stem locking mechanism attached to a portion of the channel insert. According to this aspect, the stem locking mechanism may also a swiveling gate held by a pin which is inserted into a slot formed into a sidewall portion of one of stem guide rails, and a swiveling gate lock which is disposed on a sidewall portion of the of other stem guide rails. In addition, the stem locking mechanism may also include an extension bar attached to the swiveling gate lock, allowing a user to lock and unlock the swiveling gate lock while the safety cookware device is secured to the safety trivet device.

Another object of this invention is to provide a safety trivet device for receiving and supporting a safety cookware device having a stem and keyed block, the safety trivet device may have a trivet member having a keyed insert slot for providing an opening that is configured to match and mate with the keyed block of the safety cookware device, the keyed insert slot may be configured to catch and block a portion of the keyed block when the safety cookware device is rotated 45 degrees (an eighth of a turn) or more in a clockwise or counterclockwise direction, preventing the safety cookware device from being removed off the safety trivet device, and a plurality of post members coupled to a bottom portion of the trivet.

In one embodiment the keyed insert slot may be formed and shaped within the trivet member by rods, bars, wires, or other elongated rigid materials. In another embodiment, the trivet member may include a solid platform in which the keyed insert slot is formed. In yet another embodiment, the keyed insert slot may be proximate to a center region of the keyed safety trivet device.

In other implementations, the keyed insert slot may include an egg-shaped keyed insert slot, a 6-stared keyed insert slot, an oval keyed insert slot, a rectangular keyed insert slot, or any keyed insert slot that is asymmetric in shape.

These and other objects, features and advantages of the present invention will become more apparent in light of the following detailed description of preferred embodiments thereof, as illustrated in the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2A and FIG. 2B illustrate a top and perspective views, respectively, of a safety trivet device having a trivet and channel insert, according to an embodiment.

FIG. 4A illustrates a top of the channel insert while FIG. 4B illustrates a cross-sectional view of the channel insert, according to another embodiment.

FIG. 13A-FIG. 13C illustrate an example of bottom views of a keyed safety member having a keyed block of the safety cookware device, according to an embodiment.

FIG. 15A-FIG. 15D illustrate a bottom view of the keyed safety trivet device having different shaped keyed insert slots, according to another embodiment.

FIG. 16A-FIG. 16D illustrate a side view of keyed blocks and their corresponding keyed insert slot of the keyed safety trivet device, according to another embodiment.

FIG. 17A-FIG. 17D illustrate a top perspective view of the keyed blocks and their corresponding keyed insert slot of the keyed safety trivet device of FIG. 16A-FIG. 16D, respectively, according to another embodiment.

DETAILED DESCRIPTION

Figure 1A:
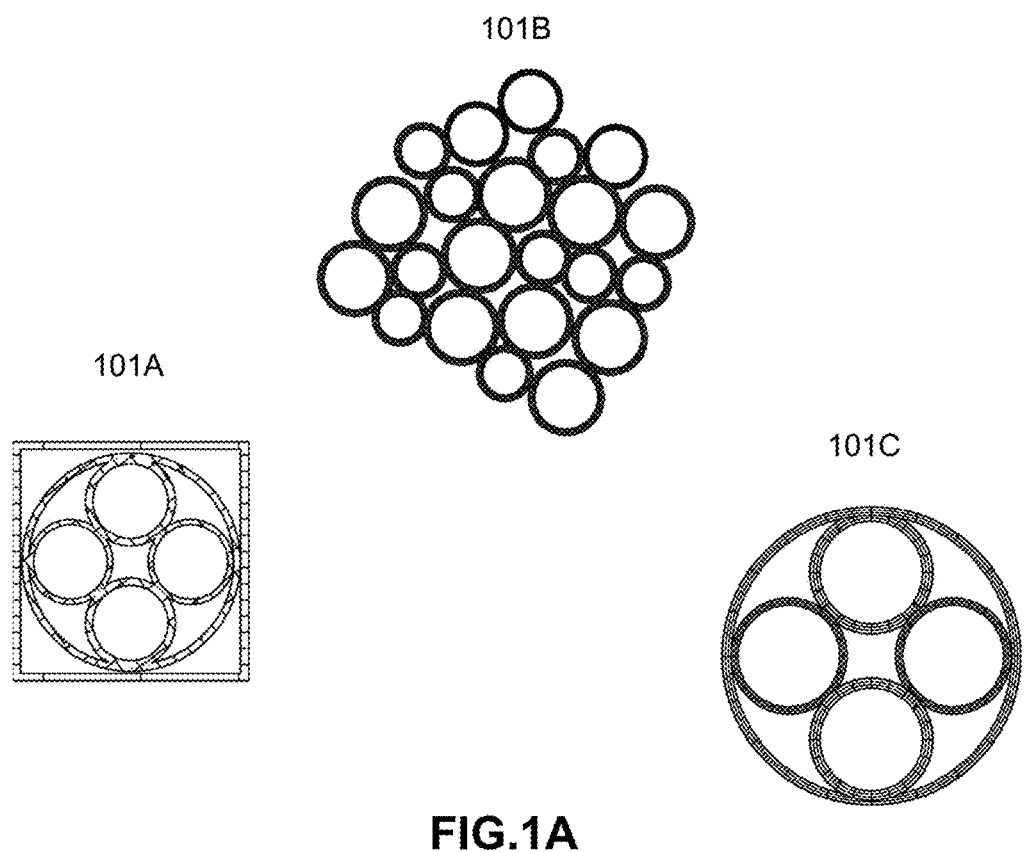
FIG. 1A and FIG. 1B illustrate top and bottom views, respectively, of various trivet shapes and designs.
Figure 1B:
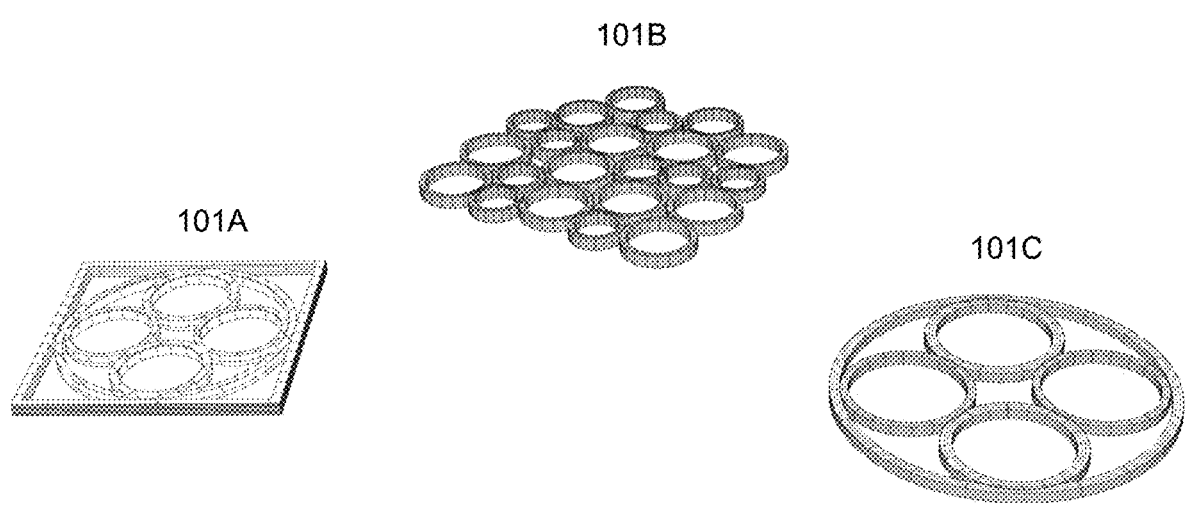

FIG. 1A and FIG. 1B illustrate top and bottom views, respectively, of various trivet shapes and designs including, for example, a square shaped pattern 101A, a random and asymmetric shaped pattern 101B, or symmetric shaped pattern 101C. In practice, the trivet or hot pad may include a heat-absorbing, planar and rigid platform that when placed between a heated cookware (i.e., pot or pan) and a table or countertop, shields and protects the surface of the table or countertop from heat damage.

FIG. 2A and FIG. 2B illustrate a top and perspective views, respectively, of a safety trivet device 200 having a trivet 201 and channel insert 203, according to an embodiment. The channel insert 203 may include mounting posts 205a-205d coupled between the channel insert 203 and the trivet 201. These mounting posts 205a-205d provide a means to raise and offset the channel insert 203 above the trivet 201 while securing it to the top side of the trivet 201. In practice, since the safety trivet device 200 is intended to receive heated cookware, materials for constructing the device 200 may include heat-resistance materials such as metal, wood, ceramic, glass, and/or composite plastics. The safety trivet device 200 may be molded via plastic molding injection or printed via 3D printing as a single unitary device or may include separate components (i.e., trivet 201, channel insert 203, and posts 205a-205d) that are fastened together using welding techniques, adhesives, screws or other fasteners or fastening mechanisms.

Figure 3A:
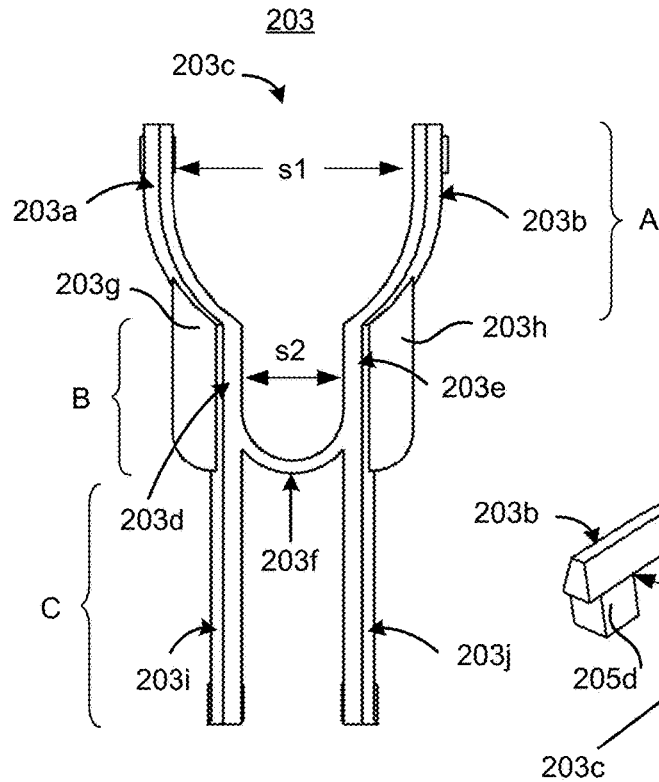
FIG. 3A-FIG. 3C illustrate a top, perspective, and front side views, respectively, of the channel insert, according to another embodiment.
Figure 3B:
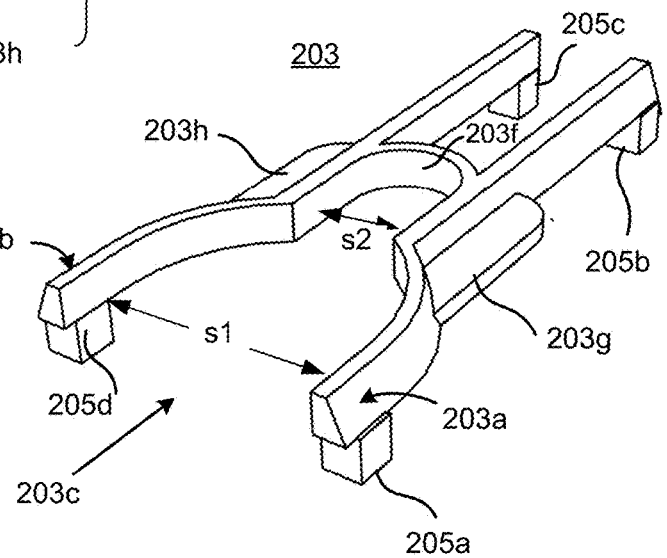
Figure 3C:
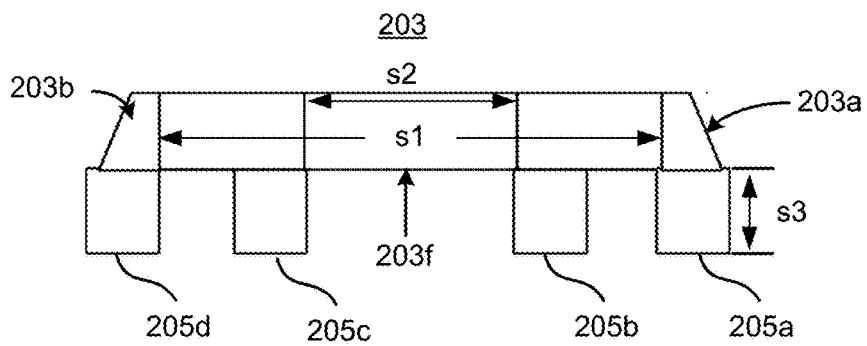

FIG. 3A-FIG. 3C illustrate a top, perspective, and front side views, respectively, of the channel insert 203, according to another embodiment. The channel insert 203 may include an cookware insert members A formed by two guide rail members 203a and 203b separated by a fixed distance s1, forming the cookware insert members A at an insert slot 203c of the channel insert 203 as shown in FIGS. 3A and 3B. The cookware insert members A may be structured to have a wine glass shape, where the two insert guide rail members 203a and 203b are widest apart at the insert slot 203c and gradually narrows and connects to a stem channel and block locks B. The stem channel and block locking components B may include two stem guide rails 203d, 203e generally parallel and separated by a distance s2. The stem channel and block locking components B may also include a channel stop 203f connecting the two stem guide rails 203d, 203e, as well as two planar block locks 203g, 203h which are coupled to the two stem guide rails 203d, 203e, respectively. Finally, back support rails C, formed by rail members 203i and 203j and separated by distance s2, may be coupled to the stem channel and block locking components B, providing support and keeping the channel insert 203 planar when attached to the trivet 201. In FIG. 3C, the two front posts 205a, 205d and back posts 205b, 205c may be coupled to a bottom side of the channel insert 203, raising it above the trivet 201 and offsetting it by a separation distance s3.

Figure 10A:
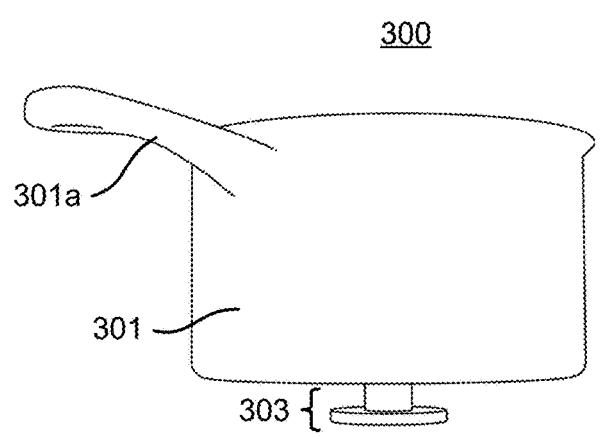
FIG. 10A-FIG. 10E illustrate a safety cookware device and safety member thereof that may be inserted and supported by the safety trivet device, according to an embodiment.

In some applications, the safety trivet device 200 may receive and support both the conventional pot and pan cookware and safety cookware devices. For example, the channel insert 203 of the safety trivet device 200 includes the stem channel and block locking components B that are configured to receive and couple to a matching stem and block that is attached the safety cookware as described in U.S. Pat. No. 10,561,265B2 and in FIG. 10A-FIG. 10C.

FIG. 4A illustrates a top of the channel insert 203 while FIG. 4B illustrates a cross-sectional view of the channel insert 203 along a horizontal line d1 of FIG. 4A, according to another embodiment. As shown in cross-sectional view of FIG. 4B, a cross-wise section T1 of the stem guide rail member 203d and a lengthwise section T2 of the planar block lock 203g and the stem guide rail member 203d are generally perpendicular to one another, having an L-shaped structure (T1, T2) where the lengthwise section T2 has an extended length that is longer than the length of cross-wise section T1. Since the channel insert 203 is generally symmetric along a centerline S, this L-shaped structure (T1, T2)

also applies to the planar block lock 203h and stem guide rail member 203e. In application, approximate dimensions for the channel insert 203 are as follows: 260 mm Length (L)×100 mm Width (W)×25 mm Height (H) while the approximated distances of s1, s2, and s3 may be 90 mm, 36 mm, and 15 mm, respectively.

Figure 5A:
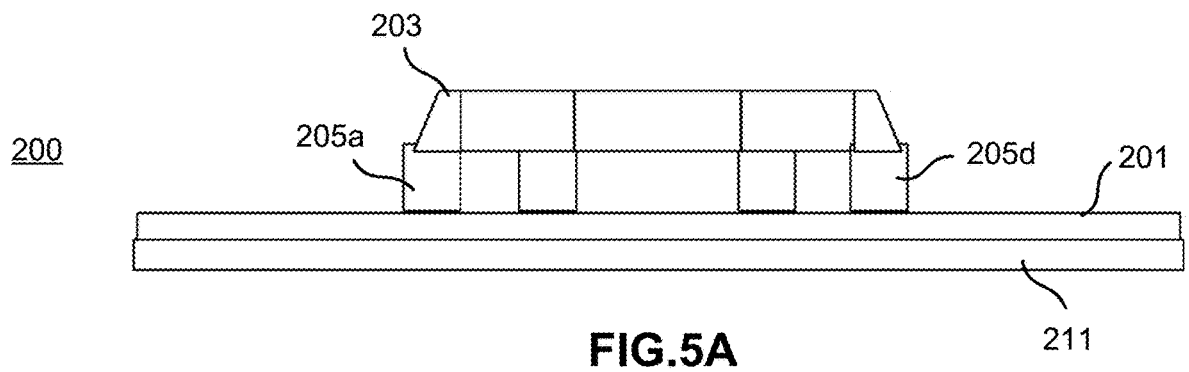
FIG. 5A-FIG. 5C illustrate a pad member coupled to a bottom perimeter portion of the safety trivet device, according to another embodiment.
Figure 5B:
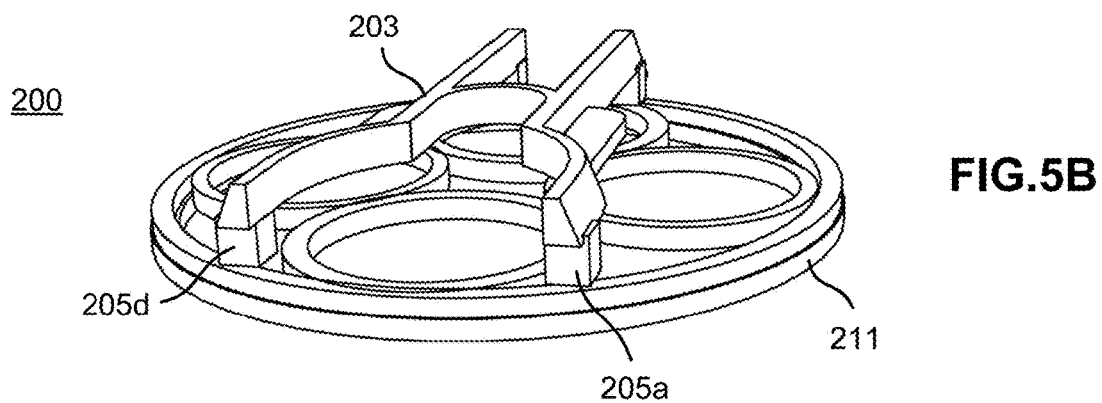
Figure 5C:
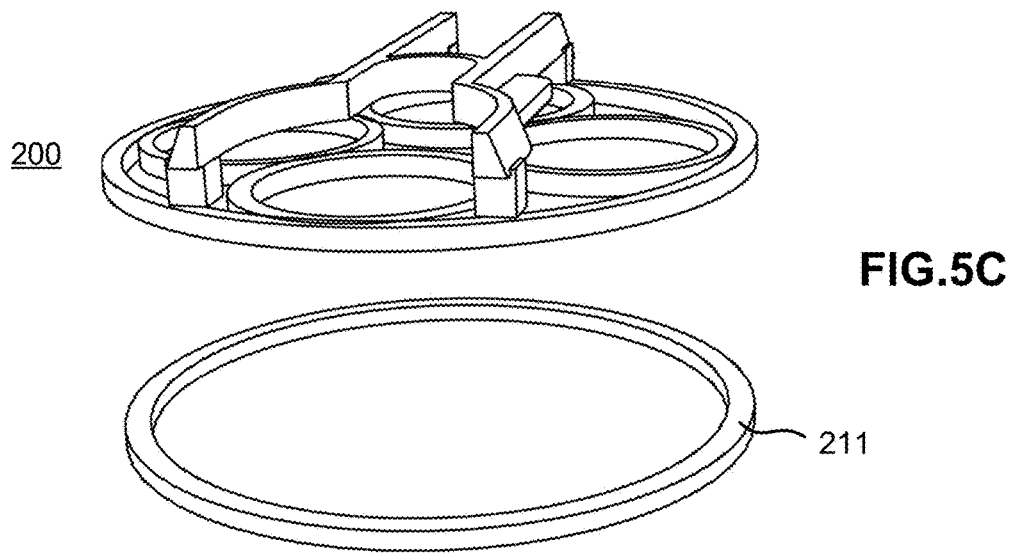

FIG. 5A-FIG. 5C illustrate a pad member 211 coupled to a bottom perimeter portion of the safety trivet device 200, according to another embodiment. FIG. 5A and FIG. 5B show a side profile view and top perspective view, respectively, of the safety trivet device 200 with the pad member 211 attached and covering, spanning, raising, and protecting the bottom perimeter portion of the safety trivet device 200. FIG. 5C illustrates an exploded view of the safety trivet device 200 and the pad member 211 having a ring-like structure which acts as a protective, non-scratching and non-slip barrier which is configured to match and mate to the bottom perimeter portion of the safety trivet device 200, providing protection and grip between the safety trivet device 200 and countertop or table.

In one implementation, the pad member 211 may include soft and durable materials having non-slip and non-scratching properties such as, for example, neoprene, foam, polyethylene, rubber, silicone foam, urethane, cork, rubber, felt, acrylic, and polyester. In another implementation, the pad member 211 may be attached and fastened to the safety trivet device 200 using mechanical fasteners such as screws, pins, nails, or adhesives such as adhesive tapes, liquid glues, or adhesive gels. In other implementations, the pad member 211 may include other shapes and sizes that are intended match and conform to different trivet shapes and sizes as shown in FIG. 1A-1B.

Figure 6A:
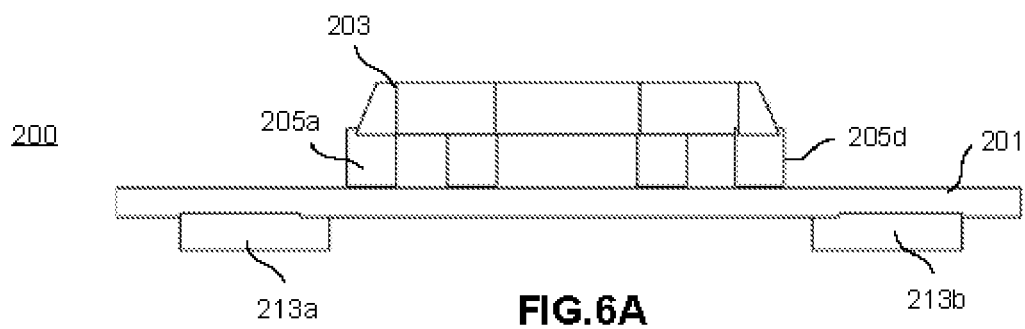
FIG. 6A-FIG. 6C illustrate multiple pad members coupled to the bottom perimeter portion of the safety trivet device, according to another embodiment.
Figure 6B:
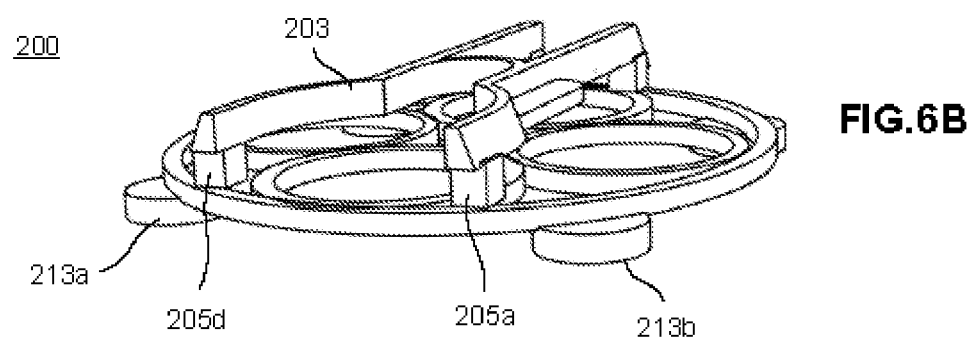
Figure 6C:
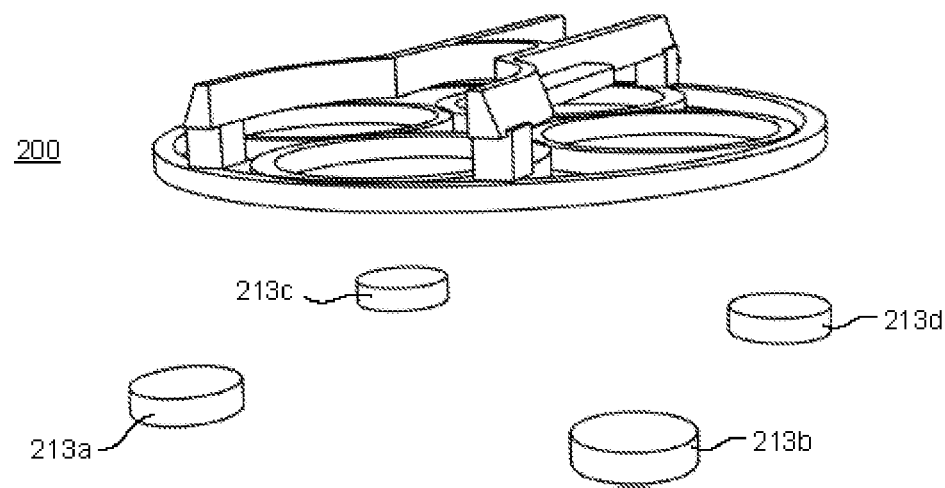

FIG. 6A-FIG. 6C illustrate multiple pad members coupled to the bottom perimeter portion of the safety trivet device 200, according to another embodiment. As shown in a side profile view (FIG. 6A) and top perspective view (FIG. 6B), four pad member (213a, 213b, 213c, 213d) may be attached to the outer bottom perimeter of the safety trivet device 200, and may equally distributed along the outer bottom perimeter, raising and protecting the bottom perimeter portion of the safety trivet device 200. FIG. 6C illustrates an exploded view of the safety trivet device 200 and the multiple pad members (213a, 213b, 213c, 213d) each having a disc-like structure with non-scratching and non-slip properties, providing protection and grip between the safety trivet device 200 and countertop or table. In one implementation, the multiple pad members (213a, 213b, 213c, 213d) may include soft and durable materials having non-slip and non-scratching properties such as, for example, neoprene, foam, polyethylene, rubber, silicone foam, urethane, cork, rubber, felt, acrylic, and polyester. In another implementation, the pad members (213a, 213b, 213c, 213d) may be attached and fastened to the safety trivet device 200 using mechanical fasteners such as screws, pins, nails, or adhesives such as adhesive tapes, liquid glues, or adhesive gels.

Figure 7A:
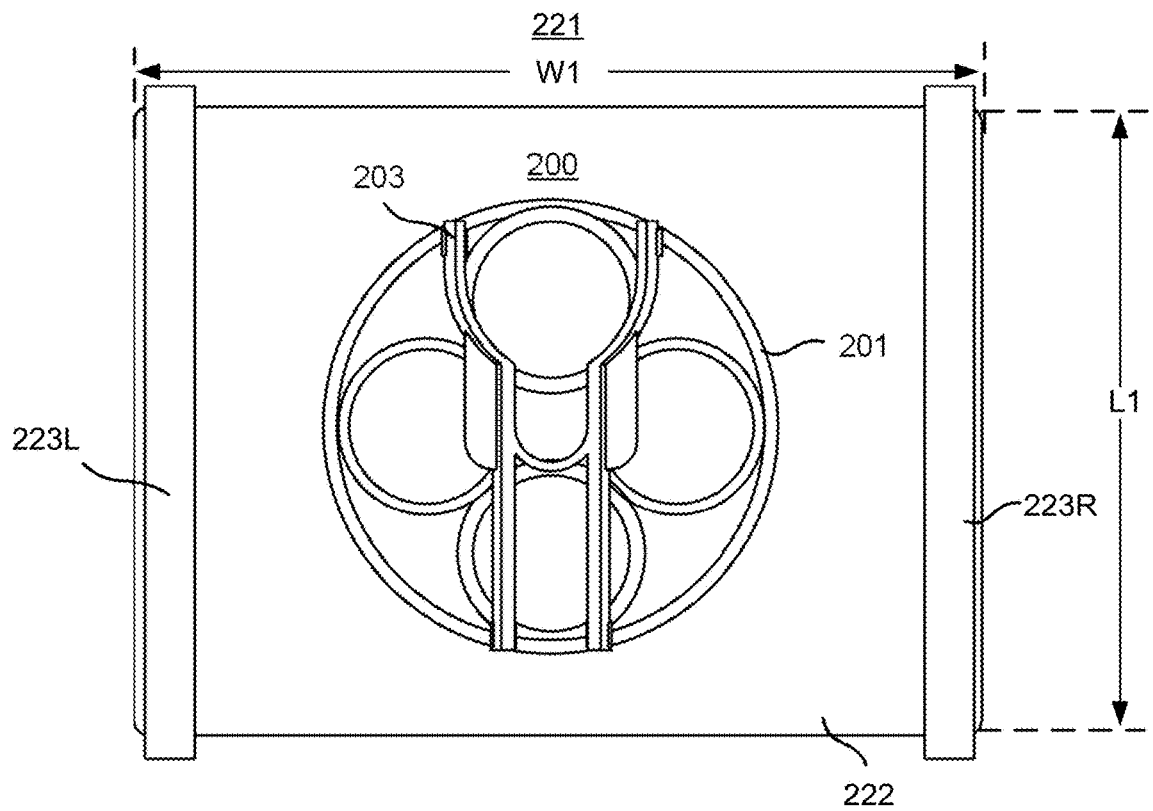
FIG. 7A and FIG. 7B illustrate a top and perspective views, respectively, of a safety trivet device having a carrier tray attached to a bottom portion of the trivet, according to an embodiment.
Figure 7B:
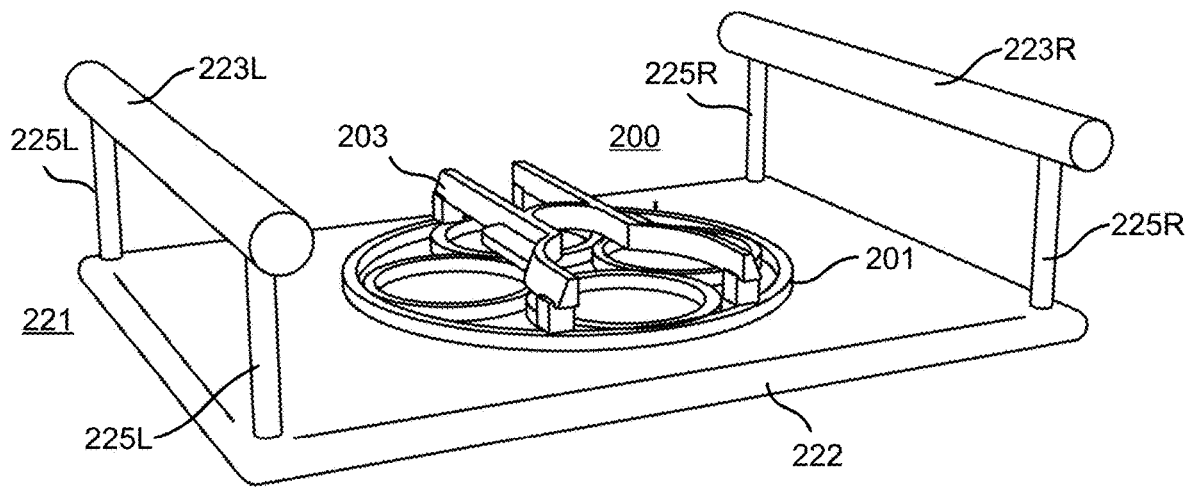

FIG. 7A and FIG. 7B illustrate a top and perspective views, respectively, of a safety trivet device 200 having a carrier tray 221 attached to a bottom portion of the trivet 201, according to an embodiment. The carrier tray 221 may include a base tray 222 coupled to the bottom portion of the safety trivet device 200, a left handle support member 223L and a right handle support member 223R coupled at each end of the base tray 222 via tray post members 225R, 225L. In one implementation, the safety trivet device 200 may be secured to the top portion of the carrier tray 221 using mechanical or adhesive fasteners. In another implementation, the carrier tray 221 and the safety trivet device 200 may be fabricated and molded as a single unitary structure. In practice, the base tray 222, having a fixed width W1, acts as carrying platform to transport the safety trivet device 200 with the cookware device placed and secured to safety trivet device 200. The base tray 222 may have an area defined by width W1 and length L1, and may be sized to accommodate household cookware devices, especially large sized pots and pans. In one implementation, the base tray 222 is made to be rigid and durable to support and carry heavy cookware devices without flexing or bending, yet light enough to provide comfort and easy of carry for the user.

Figure 8A:
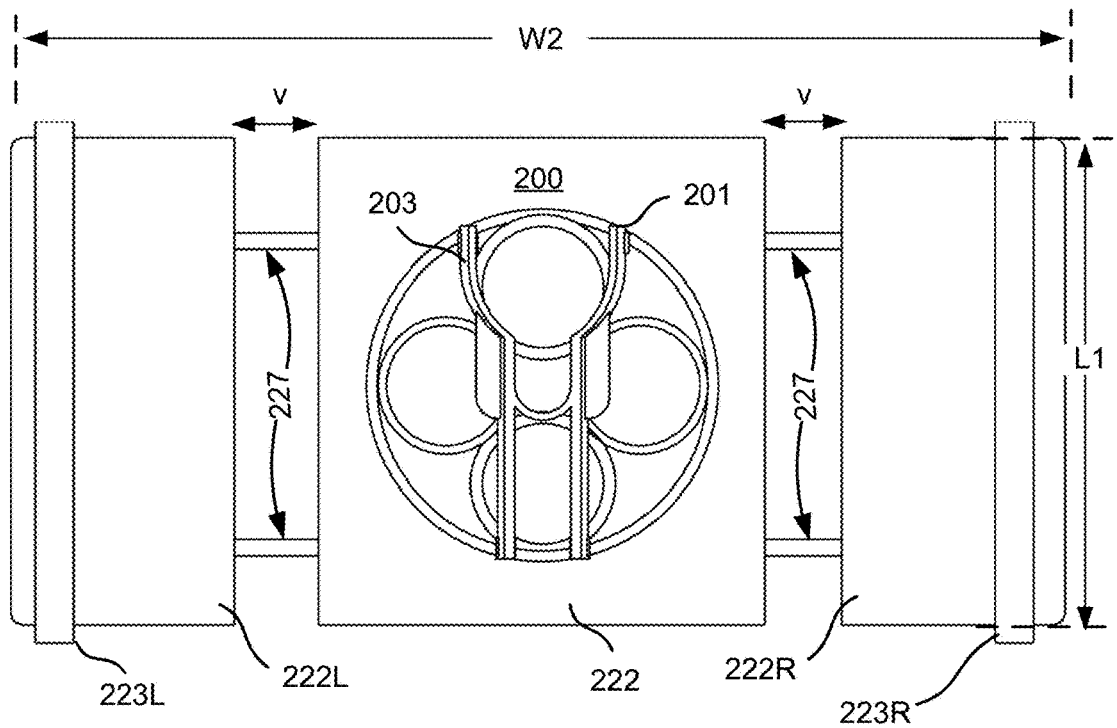
FIG. 8A and FIG. 8B illustrate a top and perspective views, respectively, of a safety trivet device having the carrier tray having an expanding base portion, according to an embodiment.
Figure 8B:
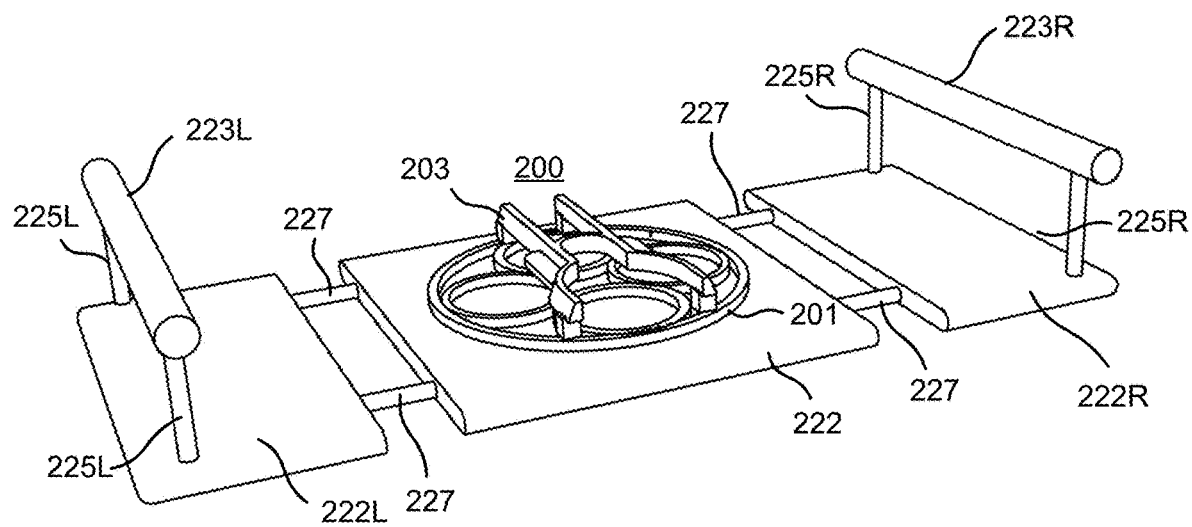

FIG. 8A and FIG. 8B illustrate a top and perspective views, respectively, of the carrier tray 221 having expanding members coupled to the base tray 222, according to an embodiment. The base tray 222 may include expanding trays (222R, 222L) coupled to each end of the base tray 222 via rods 227 which are inserted into holes (not shown) formed on each side of the base tray 222 and on each end of the expanding trays (222R, 222L). The rods 227 may include tubes, bars, or other elongated rigid objects which are pressure fitted into the holes, allowing the expanding trays (222R, 222L) to sliding in and out while keeping it secured to the rods 227. In practice, the base tray 222 with expanding members (222R, 222L, 227), has an adjustable width W2, allowing the user to adjust the width of the base tray 222, along a horizontal direction v, to accommodate different sizes of household cookware devices, such as large sized pots and pans. The expanding members may increase the total base tray 222 total a width W2 of 24" or more.

Figure 9A:
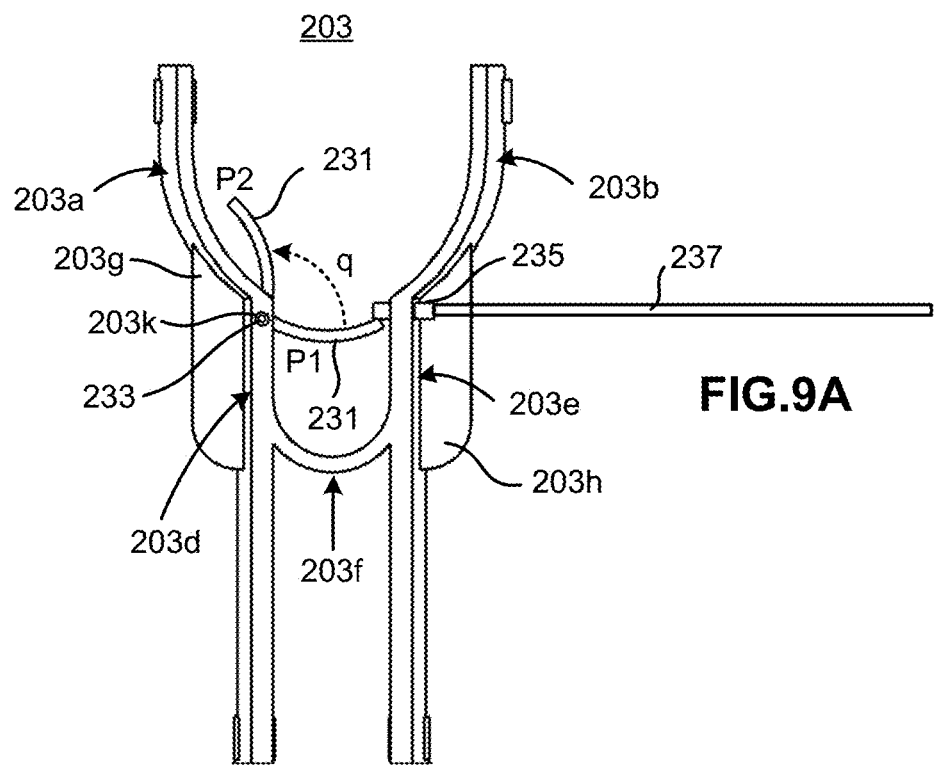
FIG. 9A and FIG. 9B illustrate a top and perspective views, respectively, of a safety trivet device having a stem locking mechanism attached to a portion of the channel insert, according to an embodiment.
Figure 9B:
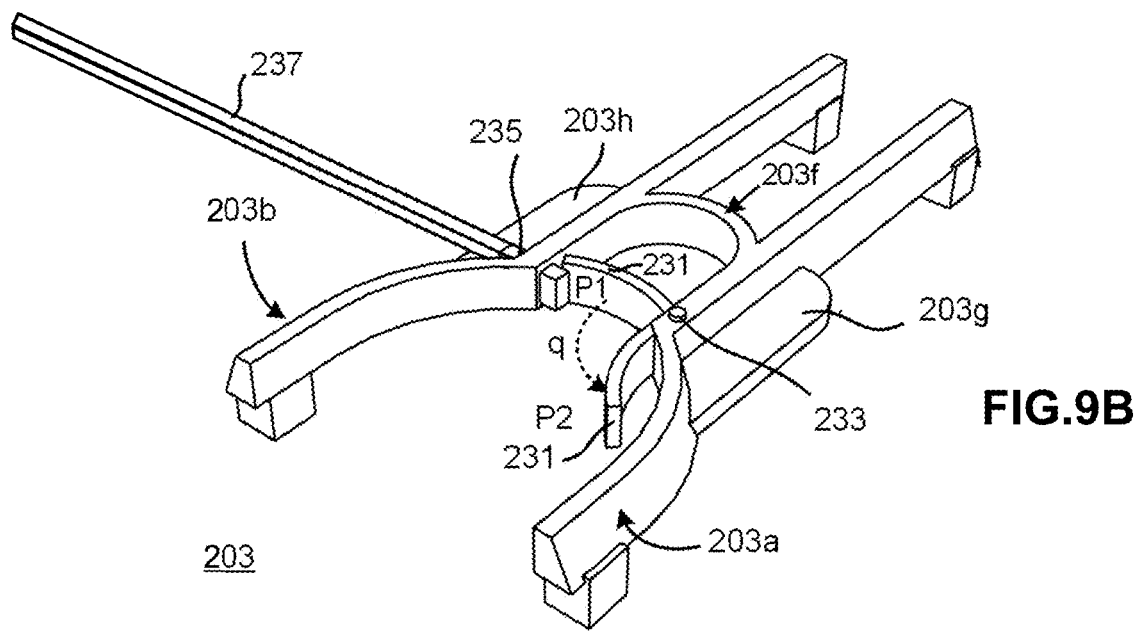

FIG. 9A and FIG. 9B illustrate a top and perspective views, respectively, of a safety trivet device 200 having a stem locking mechanism attached to a portion of the channel insert 203, according to an embodiment. The stem locking mechanism attached may include a swiveling gate 231 held by a pin 233 which is inserted into a slot 203k formed into a sidewall portion of one of stem guide rails 203d, and a swiveling gate lock 235 which is disposed on a sidewall portion of the of other stem guide rails 203e. The stem locking mechanism may also include a swivel spring, not shown, which may be inserted into the slot 203k, allowing the swiveling gate 231 to spring forward q when released from the swiveling gate lock 235. FIG. 9A and FIG. 9B further illustrates the swiveling gate 231 at a closed position P1 and an open position P2. An extension bar 237 may be attached to the swiveling gate lock 235, allowing users to lock and unlock the swiveling gate lock 235 while the safety cookware device is secured to the safety trivet device 200. In operation, the stem locking mechanism may act as a mechanical retainer for keeping the stem of the safety cookware device from being removed from the channel insert 203.

Figure 10C:
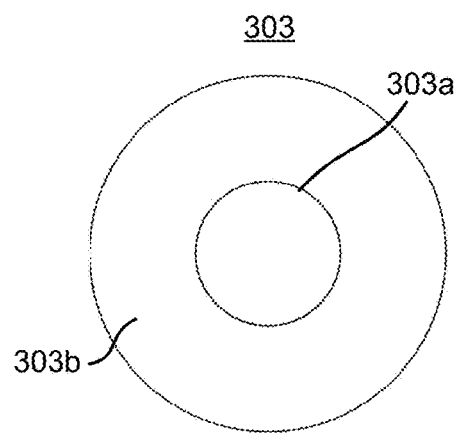
Figure 10B:
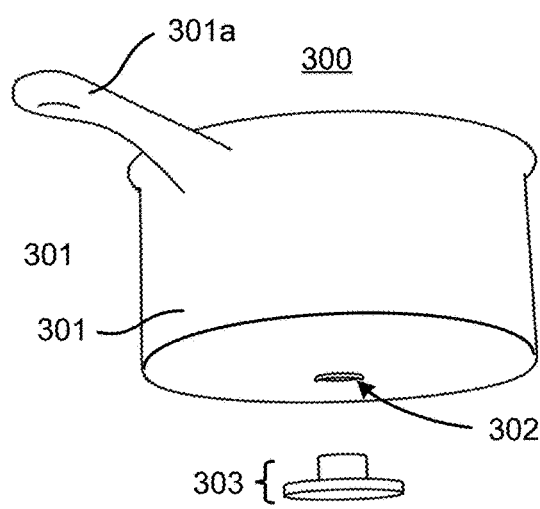
Figure 10D:
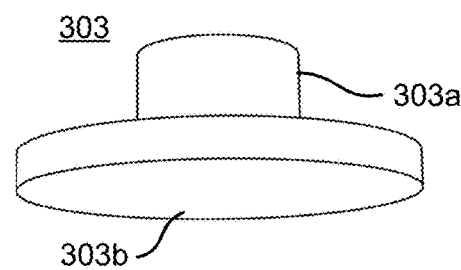
Figure 10E:
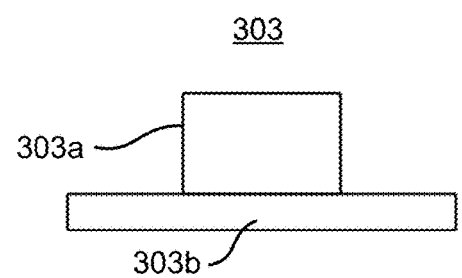

FIG. 10A-FIG. 10E illustrate a safety cookware device and safety member thereof that may be inserted and supported by the safety trivet device 200, according to an embodiment. The safety cookware device 300 may include a cookware device 301, such as pot or pan, having a safety member 303 centrally attached to a bottom portion of the cookware device 301. The safety member 303 may include a stem 303a and a block 303b attached to one end portion of the stem 303a as shown in FIG. 10C-FIG. 10E (top, front perspective, side views, respectively). In one embodiment, the safety member 303 may be secured to the cookware device 301 using mechanical fasteners or may be fabricated and molded as a single unitary structure. In another embodiment, the safety member 303 may be detachable as shown in FIG. 10B (bottom perspective view). The cookware device 301 may include pots or pans which have a single handle 301a as well as double handles (not shown).

In one implementation, the stem 303a and block 303b are generally cylindrically shaped in structure as shown in FIG. 10C-FIG. 10E. In another implementation, the stem 303a and block 303b may include other structures including rectangular blocks or asymmetrically shaped blocks, as well as other stem and block configuration which are disclosed in U.S. Pat. No. 10,561,265B2.

Figure 11A:
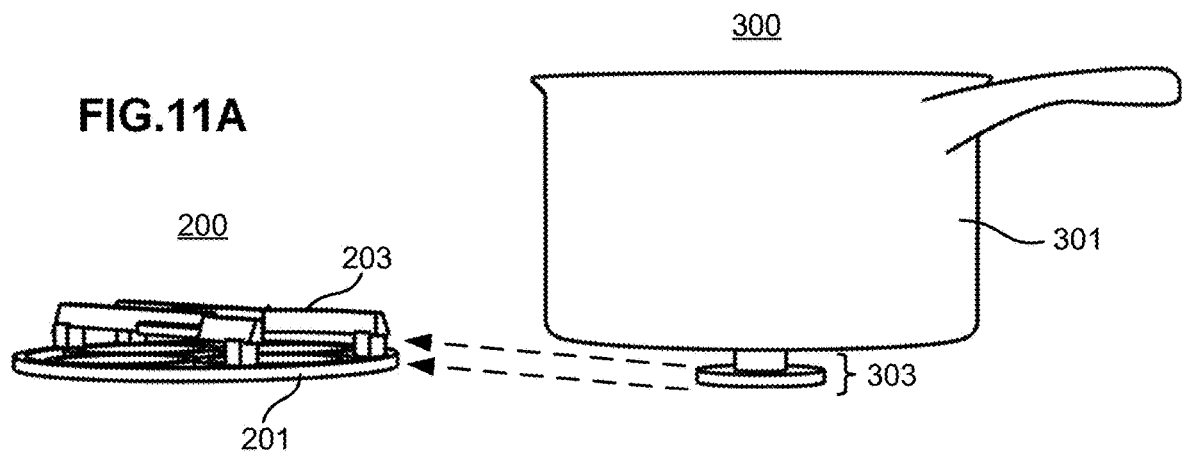
FIG. 11A-FIG. 11C illustrate a typically operation and method for inserting the safety cookware device into the channel insert of the safety trivet device by a user, according to an embodiment.
Figure 11B:
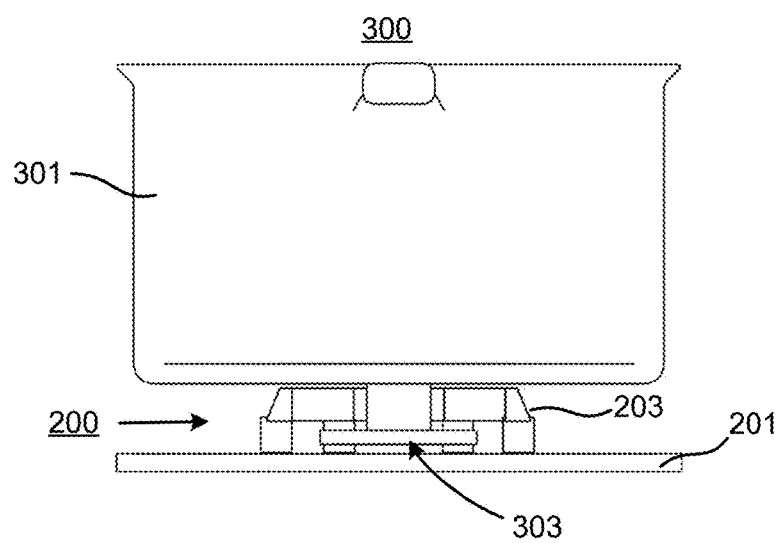
Figure 11C:
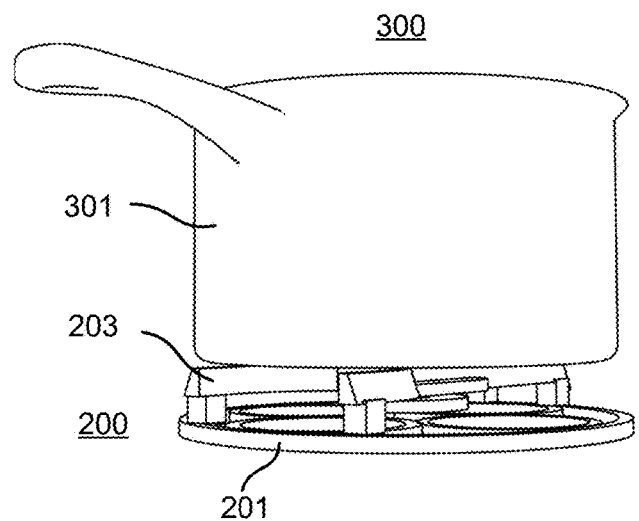

FIG. 11A-FIG. 11C illustrate a typically operation and method for inserting the safety cookware device 300 into the channel insert 203 of the safety trivet device 200 by a user, according to an embodiment. FIG. 11A illustrates the safety cookware device 300 in its upright position and proper direction of insertion (see double arrows) of the safety member 303 into the insert slot 203c of the channel insert 203. Once the safety member 303 of the safety cookware device 300 enters the insert slot 203c of the channel insert 203, the guide rail members (203a, 203b, 203d, 203e) may keep the safety cookware device 300 in place and into position while the user may fully insert the safety cookware device 300 into the channel insert 203, stopping at the channel stop 203f. When fully inserted, the stem 303a and block 303b are secured to the stem and block locking components B and channel stop 203f, having the block 303b secured and vertically fixed by the two planar block locks (203g, 203h), preventing the user from lifting and vertically removing the safety cookware device 300 from the safety trivet device 200.

Figure 12A:
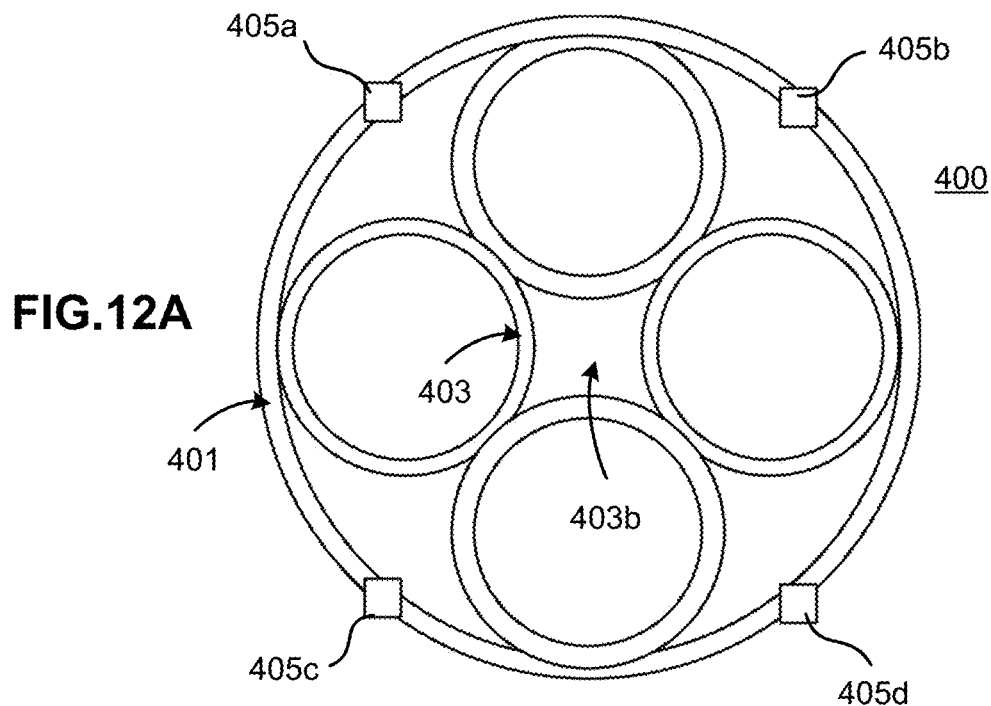
FIG. 12A-FIG. 12C illustrate another embodiment of a keyed safety trivet device having a trivet and a keyed insert slot for receiving a keyed block of the safety cookware device, according to an embodiment.
Figure 12B:
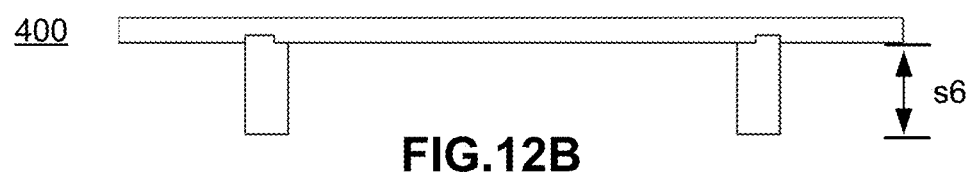
Figure 12C:
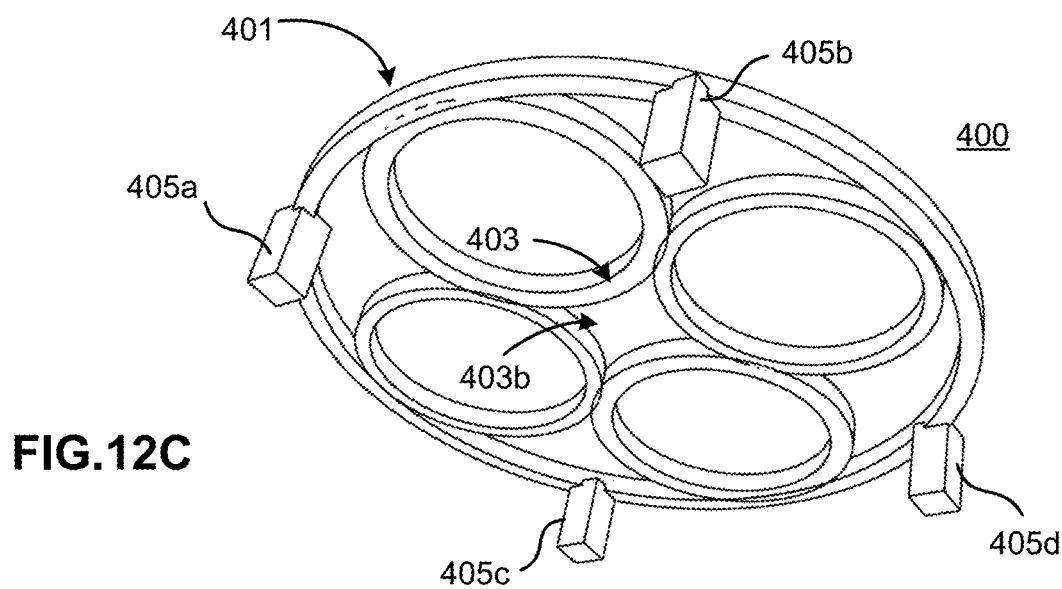

FIG. 12A-FIG. 12C illustrate another embodiment of a keyed safety trivet device 400 having a trivet 401 and a keyed insert slot 403b (female member) for receiving a keyed block (male member) of the safety cookware device 300, according to an embodiment. In one implementation, the keyed insert slot 403b, having a star-like pattern in this example, is formed and shaped within the trivet 401 by rods, bars, wires, or other elongated rigid materials. In another implementation, the keyed insert slot 403b is formed and shaped within the trivet 401 using routing, cutting, or molding techniques. In practice, the keyed insert slot 403b is intended to catch and block a corresponding keyed block of the safety cookware device 300 that when rotated 45 degrees (an eighth of a turn) or more, locks the keyed block into the keyed insert slot 403b, preventing the safety cookware device 300 from being lifted off the safety trivet device 400. The keyed safety trivet device 400 may also include mounting posts 405a-405d coupled to a bottom portion of the trivet 401, providing a means to raise and offset the trivet 401 when the keyed safety trivet device 400 is placed thereon.

FIG. 13A-FIG. 13C illustrate an example of bottom views of a keyed safety member 304 having a keyed block 303d of the safety cookware device 300, according to an embodiment. The keyed block 303d is coupled to the stem 303a of the safety cookware device 300, having a star-like shaped pattern and structure that matches the keyed insert slot 403b and configured to mate therein. The keyed block 303d may be configured to be of the same material as the safety cookware device 300 such as metal, glass, ceramics, or composite materials or other materials that are capable of withstanding high temperatures and suitable for cooking. As in the previous embodiments, the keyed safety member 304 may be molded as a single piece with the cookware device 300 or permanently or semi-permanently fastened to the cookware device 300 using fasteners such as screws or welding techniques.

Figure 14A:
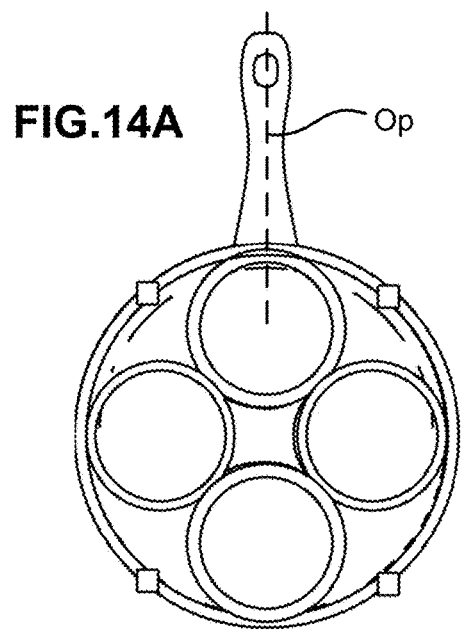
FIG. 14A-FIG. 14F illustrate an showing an example of mating and locking the keyed block of the safety cookware device to the keyed insert slot of the keyed safety trivet device.
Figure 14D:
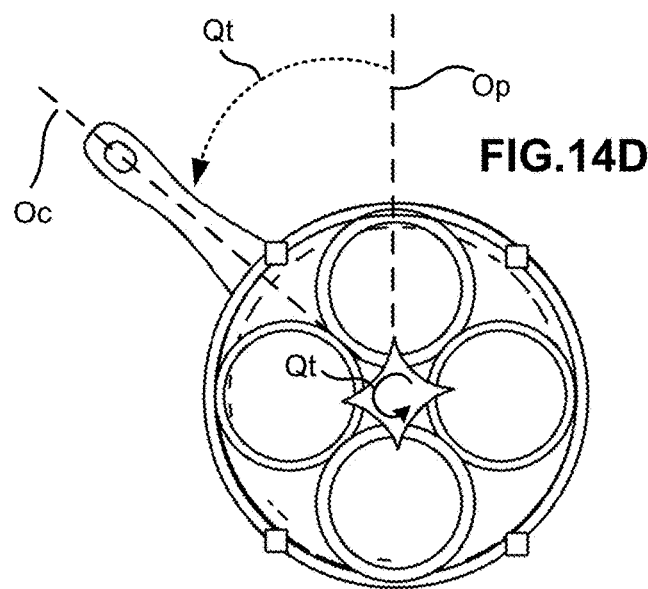
Figure 14B:
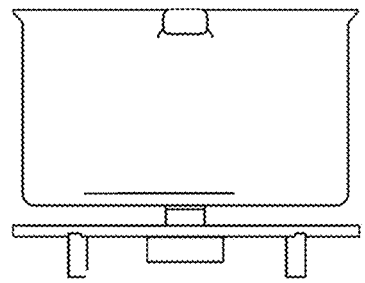
Figure 14E:
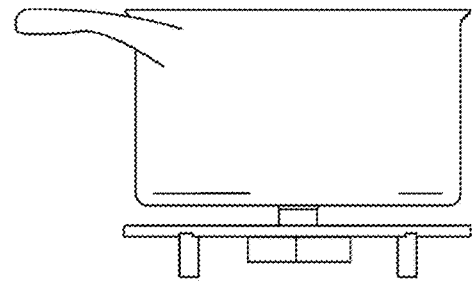
Figure 14C:
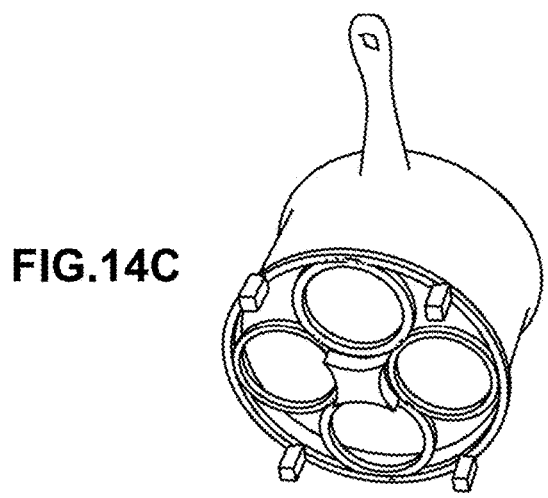
Figure 14F:
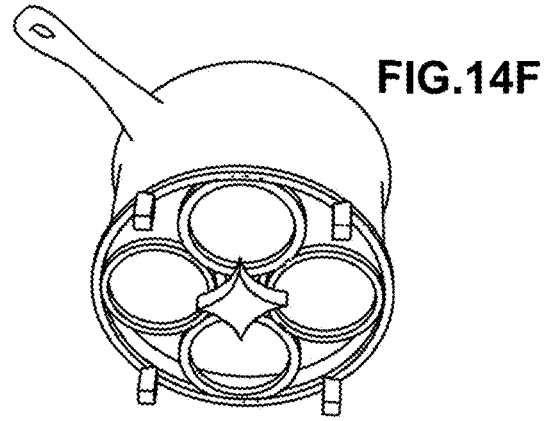

FIG. 14A-FIG. 14F illustrate an showing an example of mating and locking the keyed block 303d of the safety cookware device 300 to the keyed insert slot 403b of the keyed safety trivet device 400. In FIG. 14A-FIG. 14C, a top, side, and bottom perspective view of the safety cookware device 300 is shown with the safety cookware device 300 in an unlocked position with respect to the keyed insert slot 403b. In the unlocked position Op, the shape and pattern of the keyed block 303d of the safety cookware device 300 is aligned to the shape and pattern of the keyed insert slot 403b, allowing the user to freely insert and remove the safety cookware device 300 from the keyed safety trivet device 400. In FIG. 14D-FIG. 14E, a top, side, and bottom perspective view of the safety cookware device 300 is shown with the safety cookware device 300 in a locked position Oc with respect to the keyed insert slot 403b. In the locked position Oc, the shape and pattern of the keyed block 303d of the safety cookware device 300 is first inserted into the safety trivet device 400 and then rotated 45 degrees or more Qt in a clockwise or counterclockwise direction from its original position Op, causing a portion of the keyed block 303d to catch and block the keyed insert slot 403b, lock it into place, and preventing the safety cookware device 300 from being removed from the keyed safety trivet device 400.

FIG. 15A-FIG. 15D illustrate a bottom view of the keyed safety trivet device 400 having different shaped keyed insert slots, according to another embodiment. The keyed insert slot may include, for example, an egg-shaped keyed insert slot 403b1, a star-shaped keyed insert slot 403b2, an oval keyed insert slot 403b3, or a rectangular keyed insert slot 403b4. In this embodiment, the trivet 401 may include a solid platform in which the keyed insert slot (403b1, 403b2, 403b3, or 403b4) is formed near or at the center of the keyed safety trivet device 400 as shown. Other keyed insert slots such as triangular and generally asymmetric objects may include any other shaped patterns that are suitable for the catching and blocking the keyed block of the safety cookware device 300 when rotated 45 degrees (or an eighth of a turn) or more in a clockwise or counterclockwise direction, as described hereinabove. Examples of keyed insert slots objects that are not suitable for this application include spherically or cylindrically shaped object.

FIG. 16A-FIG. 16D illustrate a side view of keyed blocks and their corresponding keyed insert slot of the keyed safety trivet device 400, while FIG. 17A-FIG. 17D illustrate a top perspective view of the same configuration in the same order. As shown in this embodiment, the keyed blocks may include, for example, an egg-shaped keyed block 303b1, a star-shaped keyed block 303b2, an oval keyed block 303b3, or a rectangular keyed block 303b4 that is configured to match and mate with its corresponding keyed insert slot (i.e., 403b1, 403b2, 403b3, 403b4, respectively). In application, when the keyed block (303b1, 303b2, 303b3, 303b4) is inserted into its corresponding keyed insert slot (403b1, 403b2, 403b3, 403b4) of the safety trivet device 400 and then rotated an eighth of a turn (45 degrees) or more in a clockwise or counterclockwise direction, the keyed insert slot is configured to catch a portion of the keyed block, preventing the safety cookware device 300 from being lifted off the safety trivet device 400.

As used in the specification and the appended claims, the singular forms "a", "an", and "the" included plural referents unless the context clearly dictates otherwise.

The foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is:

1. A safety trivet device for receiving and supporting a safety cookware device having a stem and block components, the safety trivet device comprising:
    a trivet member; and
    a channel insert coupled to the trivet member, wherein the channel insert includes two guide rail members separated by a fixed distance to form an insert slot for receiving the stem and block components of the safety cookware device, a stem channel and block locking components coupled to the two guide rail members wherein the stem channel and block locking components include two stem guide rails and two planar block locks connected by a channel stop, and back support rails coupled to the stem channel and block locking components.

2. The safety trivet device of claim 1, wherein the channel insert includes a plurality of posts disposed between the channel insert and the trivet member.

3. The safety trivet device of claim 1, wherein a crosswise section of each said stem guide rail member is substantially perpendicular to a respective lengthwise section of each planar block lock, each said guide rail member and said planar block lock forming an L-shaped structure.

4. The safety trivet device of claim 1 further comprising a pad member having a ring-like structure coupled to a bottom portion of the trivet member, wherein the pad member has non-scratching and non-slip properties, providing protection and grip between the safety trivet device and a table or a countertop surface.

5. The safety trivet device of claim 1 further comprising plurality of pad members coupled to a bottom portion of the trivet member, wherein the plurality of pad members each have non-scratching and non-slip properties, providing protection and grip between the safety trivet device and a table or a countertop surface.

6. The safety trivet device of claim 1 further comprising a carrier tray having a base tray coupled to a bottom portion of the safety trivet device, a left handle support member coupled to a left end of the base tray by a left tray post member and a right handle support member coupled to a right end of the base tray by a right tray post member.

7. The safety trivet device of claim 6, wherein the base tray includes expanding members allowing the base tray to expand in width.

8. The safety trivet device of claim 1, wherein the stem channel and block locking components includes a stem locking mechanism attached to a portion of the channel insert.

9. The safety trivet device of claim 8, wherein the stem locking mechanism includes a swiveling gate held by a pin which is inserted into a slot formed into a sidewall portion of one of a plurality of stem guide rails, and a swiveling gate lock which is disposed on a sidewall portion of the other stem guide rails.

10. The safety trivet device of claim 9, wherein the stem locking mechanism includes an extension bar attached to the swiveling gate lock, allowing a user to lock and unlock the swiveling gate lock while the safety cookware device is secured to the safety trivet device.

11. A safety trivet device for receiving and supporting a safety cookware device having a stem and a keyed block, the safety trivet device comprising:
    a trivet member having a keyed insert slot for providing an opening that is configured to match and mate with the keyed block of the safety cookware device, wherein the keyed insert slot is configured to catch and block a portion of the keyed block when the safety cookware device is rotated 45 degrees or more in a clockwise or counterclockwise direction, preventing the safety cookware device from being removed off the safety trivet device; and
    a plurality of post members coupled to a bottom portion of the trivet member.

12. The safety trivet device of claim 11, wherein the keyed insert slot is formed and shaped within the trivet member by rods, bars, wires, or other elongated rigid materials.

13. The safety trivet device of claim 11, wherein the trivet member includes a solid platform in which the keyed insert slot is formed.

14. The safety trivet device of claim 11, wherein the keyed insert slot is proximate to a center region of the trivet device.

15. The safety trivet device of claim 11, wherein the keyed insert slot includes an egg-shaped keyed insert slot.

16. The safety trivet device of claim 11, wherein the keyed insert slot includes a star-shaped keyed insert slot.

17. The safety trivet device of claim 11, wherein the keyed insert slot includes an oval keyed insert slot.

18. The safety trivet device of claim 11, wherein the keyed insert slot includes a rectangular keyed insert slot.

19. The safety trivet device of claim 11, wherein the keyed insert slot is asymmetric in shape.

* * * * *